US008027439B2

(12) United States Patent
Zoldi et al.

(10) Patent No.: US 8,027,439 B2
(45) Date of Patent: Sep. 27, 2011

(54) SELF-CALIBRATING FRAUD DETECTION

(75) Inventors: Scott M. Zoldi, San Diego, CA (US); Steven Wu, San Diego, CA (US); Fei Chen, Green Brook, NY (US)

(73) Assignee: Fair Isaac Corporation, Minneapolis, MN (US)

( * ) Notice: Subject to any disclaimer, the term of this patent is extended or adjusted under 35 U.S.C. 154(b) by 1324 days.

(21) Appl. No.: 11/532,859

(22) Filed: Sep. 18, 2006

(65) Prior Publication Data

US 2008/0077515 A1    Mar. 27, 2008

(51) Int. Cl.
*H04M 15/00* (2006.01)
*H04M 3/00* (2006.01)
(52) U.S. Cl. ............... 379/114.14; 379/145; 379/188
(58) Field of Classification Search ............ 379/114.14, 379/133, 134, 145, 188, 189, 196, 197; 455/410; 705/1, 38, 44
See application file for complete search history.

(56) References Cited

U.S. PATENT DOCUMENTS

| | | | |
|---|---|---|---|
| 6,095,413 A | | 8/2000 | Tetro et al. |
| 6,597,775 B2 * | | 7/2003 | Lawyer et al. ............ 379/114.14 |
| 2002/0184080 A1 * | | 12/2002 | Murad et al. .................... 705/10 |
| 2002/0194119 A1 | | 12/2002 | Wright et al. |
| 2004/0177035 A1 | | 9/2004 | Silva |
| 2005/0185779 A1 | | 8/2005 | Toms |
| 2005/0278550 A1 * | | 12/2005 | Mahone et al. ............... 713/189 |
| 2006/0149580 A1 | | 7/2006 | Helsper et al. |

OTHER PUBLICATIONS

Tierney, "A Space-Efficient Recursive Procedure for Estimating a Quantile of an Unknown Distribution", *SIAM Journal on Scientific and Statistical Computing*, Dec. 1983, vol. 4, No. 4, 7 pages.
European Search Report & Written Opinion for Application No. PCT/US07/078415, dated Mar. 13, 2008, 8 pages.
International Preliminary Report on Patentability for Application No. PCT/US07/078415, dated Apr. 2, 2009, 6 pages.
Cahill, Michael H., Dian Lambert, Jose C. Pinheiro, and Don X. Sun. "Detecting Fraud in the Real World." Handbook of Massive Data Sets; 2002, 19 pages.
Chen, Fei, Diane Lambert, and Jose C. Pinheiro. "Incremental Quantile Estimation for Massive Tracking." Bell Labs; 2000, 7 pages.
Siam. "Siam Journal On Scientific and Statistical Computing: A Publication of the Society for Industrial and applied Mathematics." Siam Journal, Dec. 1983, vol. 4, No. 4, 8 pages.
Statistical Methods. "Statistical Fraud Detection." [Retrieved on Sep. 7, 2006] Retrieved from the Internet <URL: http://stat.bell-labs.com/Fraud/method.html> 3 pages.

* cited by examiner

*Primary Examiner* — Quoc D Tran
(74) *Attorney, Agent, or Firm* — Fish & Richardson P.C.

(57) ABSTRACT

A method for dynamically updating a model is described. The method includes accessing a model that specifies expected characteristics for a transaction. The model includes variables associated with fraud. The method also includes receiving at least one value for each of the variables while monitoring transactions, and updating a distribution of values for each variable based on the received value. The received value is compared with the updated distribution to determine a deviation from a threshold value associated with a percentile of the updated distribution that is indicative of fraud.

30 Claims, 7 Drawing Sheets

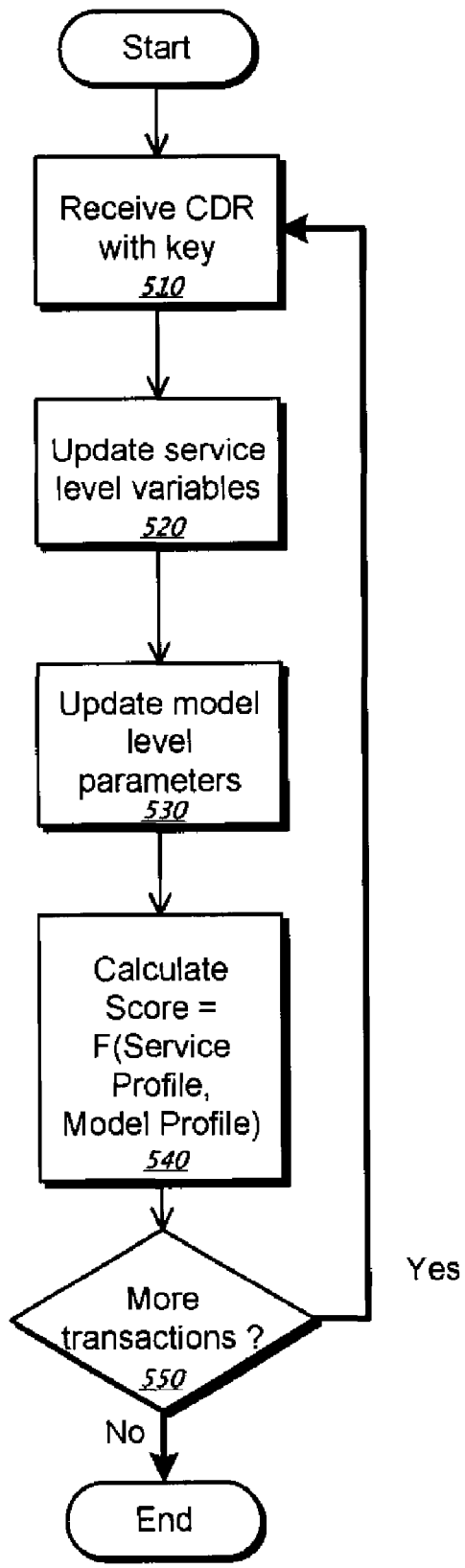

SELF-CALIBRATING FRAUD DETECTION

TECHNICAL FIELD

This specification relates to fraud detection, and, more particularly, to fraud detection using self-calibrating systems and methods.

BACKGROUND

With the increase in communications and electronic transactions, incidents of fraud associated with these activities have increased. For example, "cloning" a cellular telephone is a type of telecommunications fraud where an identifier, such as a serial number, for a cellular telephone is snooped, or read, as calls are transmitted, captured, and used to identify calls transmitted by other cellular telephones. When the other cellular telephones transmit calls, the calls may be fraudulently charged to the account holder for the original cellular telephone.

Some current systems attempt to detect fraudulent transactions, such as telecommunication fraud, by constructing a transaction model based on historical observations of transactions. By observing large number of transactions, characteristics may be derived that indicate whether a particular transaction is substantially likely to be fraudulent.

For example, characteristics of 100,000 telephone calls can be captured and later characterized as fraudulent or legitimate. The fraudulent calls may share similar characteristics and transaction patterns that are used to build static models that indicate the probability of fraud for incoming transactions. In certain systems, these static, historical models can be used in a production, or real-time, environment to evaluate a probability of fraud for incoming transactions. However, creation of the historical model may be difficult to deploy quickly because a large amount of sample observations may be necessary to construct the model. Additionally, if historical observations do not exist for a particular environment, a historical model may not have the information needed to be accurate in the detection of fraud.

SUMMARY

In general, this document describes methods and systems for self-calibrating fraud detection.

In a first general aspect, a method for dynamically updating a model is described. The method includes accessing a model that specifies expected characteristics for a transaction. The model includes variables associated with fraud. The method also includes receiving at least one value for each of the variables while monitoring transactions, and updating a distribution of values for each variable based on the received value. The received value is compared with the updated distribution to determine a deviation from a threshold value associated with a percentile of the updated distribution that is indicative of fraud.

In a second general aspect, a method for processing a transaction is described. The method includes receiving a value for a variable associated with a transaction, where the variable is indicative of fraud. The method also includes updating a distribution of values for the variable based on the received value. The updated distribution is used to determine a deviation of the received value from a selected value in the updated distribution. Additionally, the method includes determining a score indicative of a probability of fraud for the transaction based on the deviation of the received value.

In another general aspect, a system for determining fraud is described. The system includes an interface to receive values associated with a transaction. Each value corresponds to a property correlated to fraudulent transactions. The system also includes a profile updater to modify a distribution of values for each property based on the corresponding received value, and a score calculator to generate a fraud score for the transaction. Generating the fraud score includes comparing the received value with the updated distribution to determine a deviation from a threshold value of the updated distribution that is indicative of fraud.

In yet another general aspect, a method for generating a fraud indicator is described. The method includes generating a score indicative of a probability of fraud for a transaction. The generating includes aggregating self-scaling variables, where the self-scaling variables are determined by updating a distribution of values for each self-scaling variable with a received value for the self-scaling variable, determining an updated threshold value based on the updated distribution (where the updated threshold value indicates a beginning of a range of values that are unusual relative to the updated distribution), and scaling the received value based on the updated threshold value.

The systems and techniques described here may provide one or more of the following advantages. First, a system can be deployed quickly, and in environments for which historical data is limited or nonexistent. Second, a system can increase accuracy of fraud detection by permitting user-specified segmentation of a model population. Third, a system may reduce complexity of data mapping and data validation by using a smaller and generic data application programming interface (API). Fourth, a system can use adaptive variable scaling based on real-time online approximation of variable distributions and their percentiles. Fifth, a system can use pre-built and pre-packaged analytic models, which are refined using dynamic self-scaling variables. Sixth, a system can use adaptive score calibration based on real-time online approximation of score distributions.

The details of one or more embodiments of the self-calibrating fraud detection feature are set forth in the accompanying drawings and the description below. Other features and advantages of the self-calibrating fraud detection feature will be apparent from the description and drawings, and from the claims.

DESCRIPTION OF DRAWINGS

FIG. 5A is a flowchart of transaction data processing according to one implementation.

FIGS. 5B-5C are example diagrams of a service profile and model profile, respectively.

Like reference symbols in the various drawings indicate like elements.

DETAILED DESCRIPTION

This document describes systems and techniques for dynamically updating a fraud detection model during runtime, or application, of the model. A system, such as system 100 of FIG. 1, can evaluate values from transactions, such as purchase amount for a credit card transaction, for fraud. The evaluation by the system can include integrating predictive variables such as the ratio of the received value to average value (e.g., $400.00/$160) into a previous distribution of values for a variable (e.g., ratio of current to average purchase amount). For example, the system can incorporate the ratio of purchase amount for the current credit card transaction into a distribution of previously stored values for ratios of purchase amounts. The system can then use the updated distribution to determine whether the purchase amount of the current transaction is within a range of the distribution commonly associated with a fraudulent transaction. This determination may include assigning a numerical indictor of the probability for fraud for that variable.

The system can aggregate variables for the transaction to form a score that indicates a probability that the transaction associated with the variables is fraudulent. For example, a first variable for a credit card transaction can be a ratio of purchase amount, and a second variable can be based on the time the transaction occurred. The system can aggregate numerical indicators associated with each of the variables to calculate a fraud score for the transaction. This is described more fully in association with FIGS. 1-7.

Figure 1:
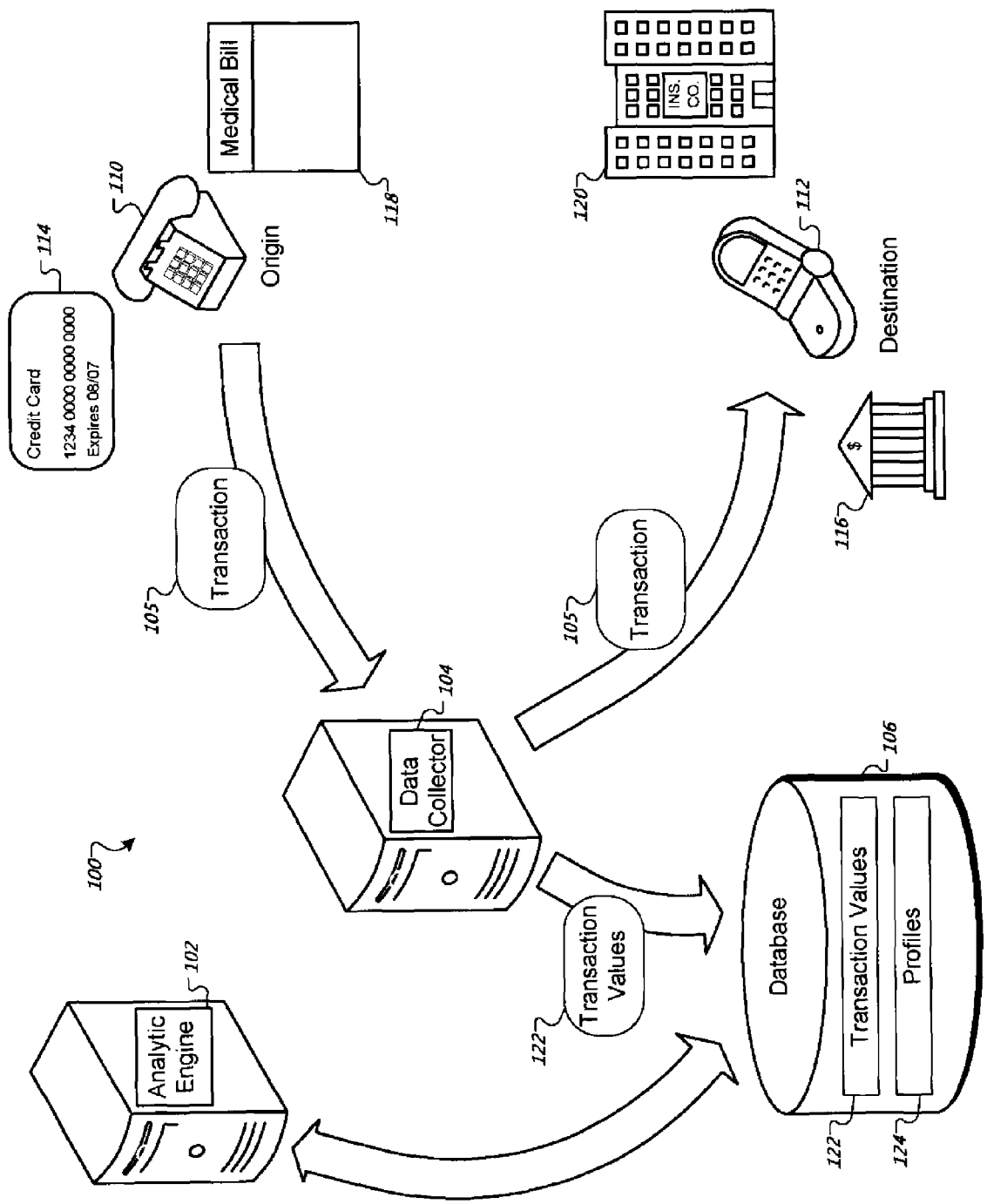
FIG. 1 is a schematic of an example system for evaluating transaction fraud using dynamically updated parameters.

FIG. 1 is a schematic of an example system 100 for evaluating transaction fraud using dynamically updated parameters. The system 100 includes an analytic engine 102, a data collector 104, a database 106, transaction origins, and transaction destinations.

There can be flexibility in the system for where certain components of the system 100 reside. In certain implementations, the data collector 104 and analytic engine 102 can reside on different computing devices as depicted in FIG. 1. In other implementations, they can reside on the same computing device. Additionally, the database 106 can reside on the computing device that includes the analytic engine 102, on the computing device that includes the data collector 104, or on another computing device altogether.

For the example shown in FIG. 1, transaction 105 begins at a transaction origin and ends at a transaction destination. For example, a phone call can originate at a residential phone 110 and can be transmitted to a cellular phone 112. In another example, a retail purchase transaction can originate with the swipe of a credit card 114 at a point of sale (POS), and information associated with the sale can be transmitted to a bank 116. As a third example, a medical billing transaction can originate with a medical bill 118 and end with processing done at an insurance company 120.

As transactions occur, the data collector 104 collects transaction values 122 and can communicate with the database 106 to store the transaction values 122. For example, for a phone call transaction, stored values can include call length, originating country code, originating phone number, destination country code, destination phone number, call date, and call time. For a credit card transaction, transaction values can include the purchase amount, transaction date and time, merchant category code, and retailer address. For a medical transaction, transaction values that can be stored include diagnosis codes, service dates and times, and treatment codes.

In certain implementations, the database 106 contains profiles 124 that store summary statistics, such as percentile values and variables that constitute the fraud feature detectors. The profiles 124 can be updated in the database 106 after the transaction values 122 are stored. For example, the profiles 124 can be updated immediately after each transaction is stored or the updates can occur on a periodic or batch schedule. In certain implementations, the data collector 104 performs the profile updating. In other implementations, the analytic engine 102 can perform the profile updating.

The percentile values stored in the profiles 124 can include parameters used to calculate fraud probabilities. For example, the analytic engine 102 can determine that all phone calls which are longer than the 99th percentile phone call value are at high risk for fraud.

The most recently stored transaction value can affect the value of the percentile parameters. For example, suppose that a very long phone call transaction occurs, such as a twenty-hour call, and that the call length is greater than the existing 99th percentile parameter for call length. When the 99th percentile parameter is recalculated after the twenty-hour call length is stored as part of the previously stored values, a new, higher 99th percentile value for a distribution of the stored values will be stored in the profile 124, which can affect future fraud detection calculations. This dynamic updating of fraud detection parameters can make the system self-calibrating, which may increase the accuracy of the system to detect fraud even if the distribution of values shifts over time. This self-calibrating feature also may permit the system to be deployed more quickly because the system may not be dependent upon an existence of a large amount of historical data for determining parameter values.

In certain implementations, the percentile parameters that indicate fraud for the variables are calculated using techniques described in "A Space-Efficient Recursive Procedure for Estimating a Quantile of an Unknown Distribution," Tierney, L., SIAM Journal on Scientific and Statistical Computing, 4:706-711, 1983, and "Incremental Quantile Estimation for Massive Tracking," Chen, F., Lambert, D., and Pinheiro, J., Proceedings of the AAAI 2000 Conference on Knowledge Discovery and Data Mining, 2000, the entirety of which are incorporated herewithin.

For example, for a given variable x, its r-th percentile $\bar{x}^r$ may be dynamically computed as the observations of x are received. Additionally, the percentile estimation can be iteratively applied. An iteration can include observing M consecutive observations, where $M \geq 1$ is a free parameter. At the n-th iteration, an estimate of $\bar{x}^r$ is updated, where this estimate is denoted by $\bar{x}_n^r$ at the n-th iteration. The i-th observation is denoted in the n-th iteration as $x_n^i$, where i is in [1, M]. At the n-th iteration, a density estimate $f_n$ is computed for the variable x at the r-th percentile using the following equation:

$$f_n = (1 - w_n)f_{n-1} + w_n \frac{\sum_{i=1}^{M} 1\{|x_n^i - \bar{x}_{n-1}^r| \leq c_n\}}{2c_n M} \quad (1)$$

where $1\{\cdot\}$ is an indicator function that takes the value of 1 if the condition inside the curly brackets is satisfied and 0 otherwise. In addition, the initial values $f_0$ and $\bar{x}_0^r$ can be set according to prior knowledge or simply to 0 if no prior knowledge is available. The series $w_n$ and $c_n$ may satisfy some convergence criteria as detailed in the papers cited above. Among many others, one choice is $w_n = 1/n$ and $c_n = 1/\sqrt{n}$.

After $f_n$ is computed, $\bar{x}_n^r$ can be obtained as follows:

$$\bar{x}_n^r = \bar{x}_{n-1}^r + w_n \frac{r - \sum_{i=1}^{M} 1\{x_n^i \leq \bar{x}_{n-1}^r\}/M}{e_{n-1}} \quad (2)$$

where $e_n = \max\{f_n, f_0/\sqrt{n}\}$ and $f_0$ is an initial value of $f_n$.

In certain implementations, the system facilitates a hybrid approach of fixing linear model weights but allowing adaptive scaling. Because the model can be linear in design (e.g., self-scaling variables are weighted and combined linearly), the understanding of the model score may be transparent. Such a "white box" model gives users a clear view of what is causing the model to predict fraudulent activity.

Figure 2:
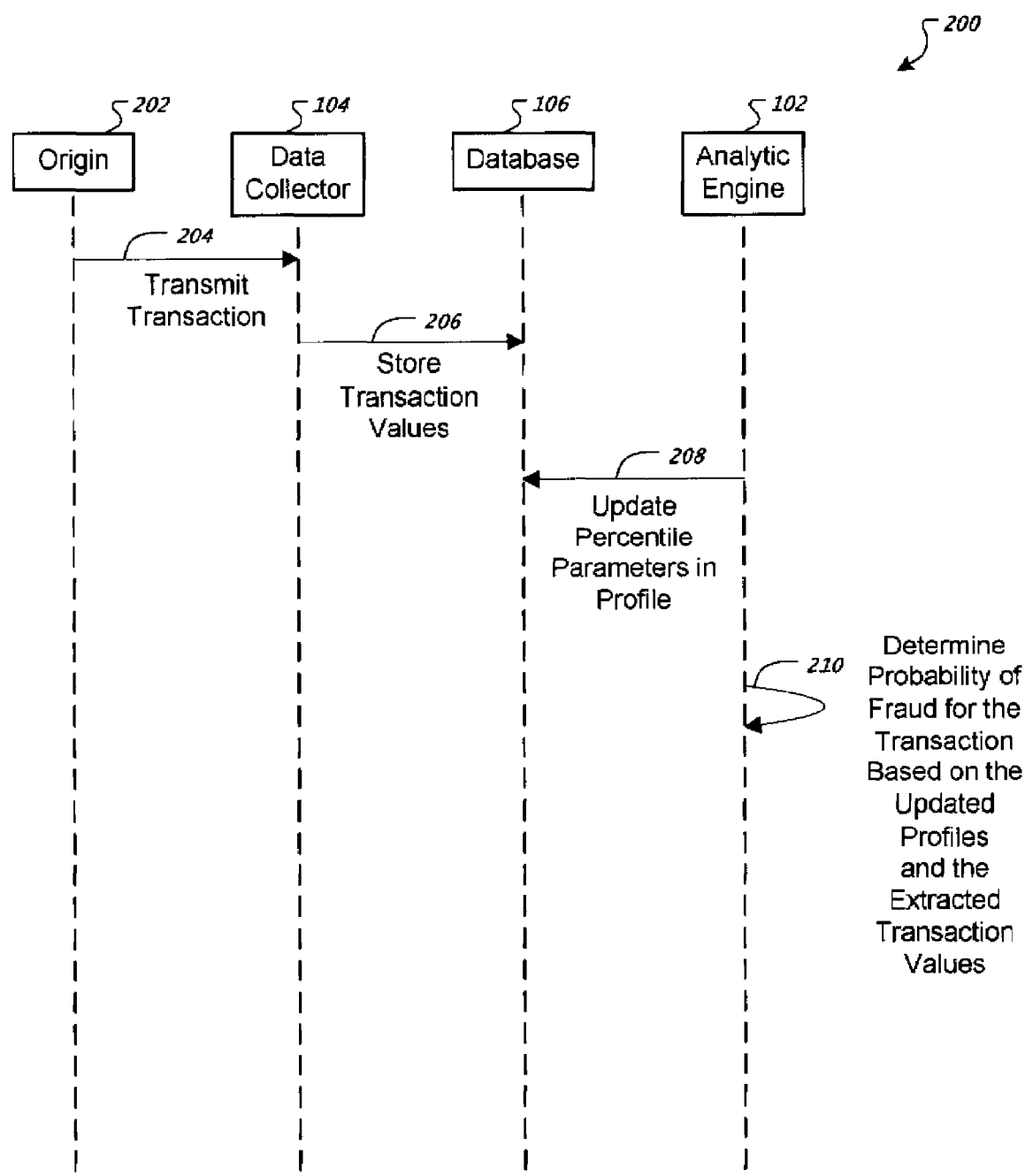
FIG. 2 is a sequence diagram of transaction processing according to one implementation.

FIG. 2 is a sequence diagram 200 of transaction processing, according to one implementation. The transaction origin 202 originates a transaction that includes transaction values, as indicated by arrow 204. For example, the transaction origin 202 may be the origin of a phone call or a credit card swipe. As describe above, examples of collected transaction values for a phone call can include call length, originating area code, charge total, and posting date.

In certain implementations, the data collector 104 collects the transaction values. The data collector 104 stores the transaction values in the database 106, as indicated by arrow 206. Some values may be stored without the data collector 104 performing any processing, but other values may be processed before being stored. For example, the value of the call length may be part of the transaction data or it may be calculated by subtracting a start time of the call from an end time of the call. After the transaction data is stored, the analytic engine 102 updates the profile, as shown by arrow 208, by recalculating summary statistics, such as percentile parameters.

For example, different threshold parameters can be updated, such as the 95th percentile purchase amount or the 99th percentile phone call length, where each percentile may indicate a threshold above which fraud is likely. These parameter values can be used in the calculation of fraud probability. One implementation describing the calculation of the percentile parameters is described above.

After updating the profile, the analytic engine 102 calculates a probability of fraud for the transaction using the updated customer profile and the updated transaction variable distribution, as indicated by arrow 210.

Figure 3:
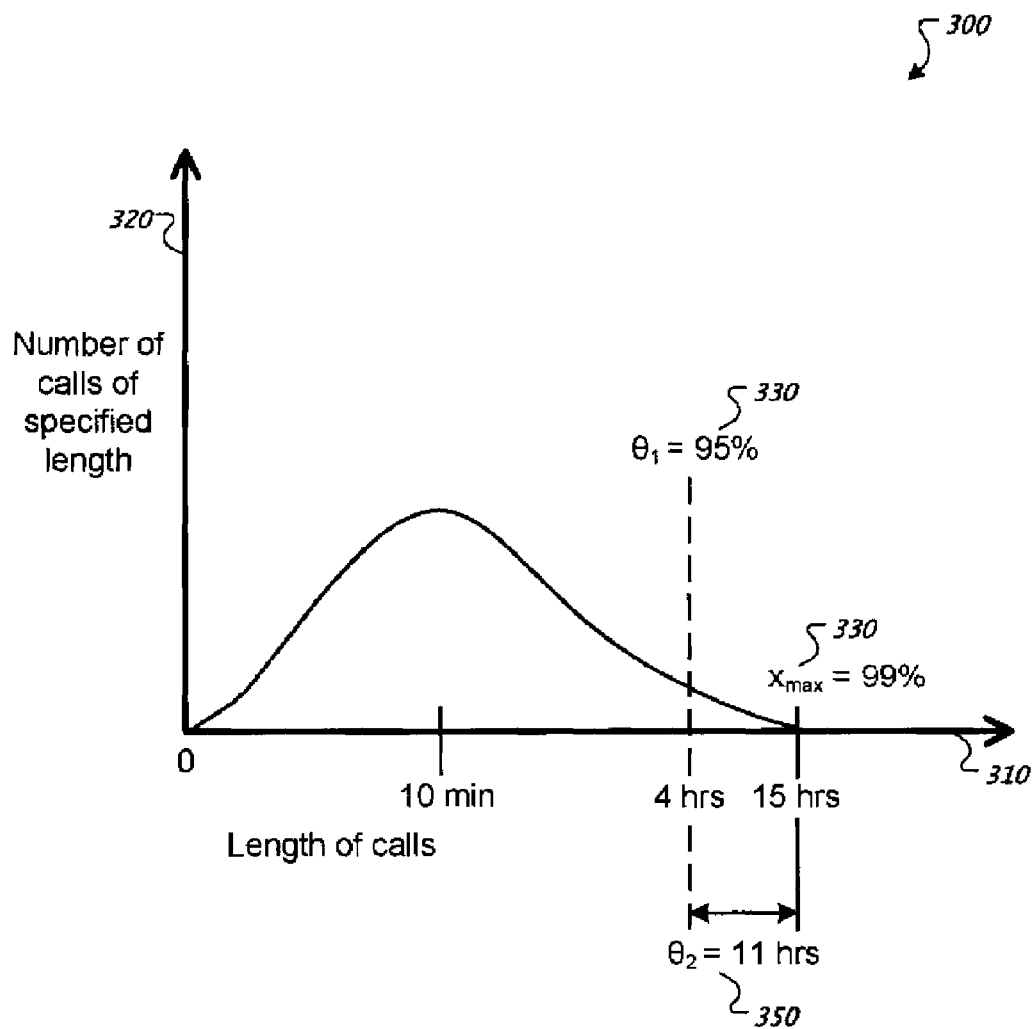
FIG. 3 is a graph of an example distribution of received values for a variable representing phone call lengths.

FIG. 3 is a graph 300 of an example distribution of received values for a variable representing phone call lengths. The length of calls is plotted along the x axis 310, and the number of calls of specified length is plotted along the y axis 320. The data is smoothed for illustrative purposes, but can also be calculated based on a histogram implementation.

In the graph 300, two threshold values are plotted. Threshold values can be used to calculate fraud probabilities, as will be discussed in more detail below. A 95% percentile threshold value 330 for this distribution has a value of four hours, which means that 95% of the phone calls in this example distribution are four hours or less. The symbol $\ominus_1$ is used to represent this threshold parameter.

In certain implementations the percentage to which $\ominus_1$ is set is based on previous empirical studies to determine what characteristics of certain transaction variables are associated with fraud. For example, studies of empirical data may show that phone call lengths that are greater than $\ominus_1$=95% have a relatively high probability of fraud. Different variable values can have different indicative threshold values. For example, the 95th percentile 330 may be indicative of fraud for phone call lengths, but a 98th percentile may be indicative of fraud for credit card purchase amounts.

In some implementations, a maximum expected (or received) transaction value is labeled as parameter $x_{max}$. In FIG. 3, a $99^{th}$ percentile threshold parameter 340 is associated with $x_{max}$ and has a value of fifteen hours. As mentioned, the value of $x_{max}$ can be substantially equal to the largest value expected or seen thus far in the distribution.

The percentile is treated as a 99% level (or some more extreme value) rather than 100% because it is often not possible to determine or predict what the largest value might be in the future. Using the extreme percentile for $x_{max}$ also may have the advantages that variable computation is more stable and the variable is less impacted by outliers in the distribution of the variable. For example, although 15 hours is the longest call currently received in the example distribution, a 17-hour call may occur in the future.

In some implementations, a parameter value $\ominus_2$ 350 expresses a variance in the received transaction values and is used to scale a value indicative of fraud. For example, $\ominus_2$ can be calculated by subtracting $\ominus_1$ from $x_{max}$. In this example distribution, $\ominus_2$ is equal to fifteen minus four (i.e. $x_{max} - \ominus_1$), which is 11 hours.

The values of $\ominus_1$ and $\ominus_2$ can be used to calculate a scaled value which may be substantially proportionate to the existence of fraud using the formula below:

$$q(x_i | \theta) \equiv \frac{x_i - \theta_1}{\theta_2} \in [0, C] \quad (3)$$

In the equation 3 above, $x_i$ is the received value for a variable. A variable is a property or characteristic of something in a transaction domain, such as call length. The received transaction value is a particular value of the variable at a given point in time. The value C is a constant that defines a maximum value to which the scaled determined value can be scaled. For example, if C is a value of 1, the scaled values would fall in the range of [0,1]. In other words, the values of q are forced to be between 0 and C.

Consider an example of the application of the equation 3 when the received transaction value $x_i$ is $x_{max}$, or a value of 15. The scaled value q would be computed then as:

$q = (15 - 4)/11 = 1$

A value of "1" would be the highest indicator of fraud for this variable. This indicates that a variable at the extreme end of the distribution (e.g., $x_{max}$), would be associated with the highest fraud indication. This can be an effective way of handling extreme outliers or variables corrupted by erroneous data inputs.

Consider another example when the received transaction value is equal to $\ominus_1$, or a value of 4 in our example distribution. The scaled value q would be computed then as:

$q = (4 - 4)/11 = 0$

A value of 0 would be indicative of a very low or substantially zero probability of fraud. This indicates that a variable on the left end of a tail of the distribution (e.g. less than or equal to $\ominus_1$) is not be indicative of fraud.

In another example, the received transaction value can be equal to something less than $\ominus_1$, such as a value of 12 minutes in our example distribution. The scaled value q would be computed as:

$q = (0.2 - 4)/11 = -3.8/11 = -0.345$

The formula can be structured so that only positive values are indicative of fraud. Non-positive values can be scaled to zero by the analytic engine, which can eliminate the non-positive values' contribution to a composite fraud score for the transaction.

The scaled value q is an indicator of the presence of fraud for one transaction variable. The analytic engine can calculate a score η which indicates a probability of fraud for the transaction by aggregating individual variables that each are associated with fraud indicators. For example in some instances, the score η can be calculated for the transaction by summing up weighted scaled values for each variable using the formula below:

$$\eta = \Sigma w_i q(x_i|\theta)$$

The q value is the scaled value determined by equation 3. Although optional, the $w_i$ values are weights assigned to variables based on their importance for detecting fraud within the model. For example, with a phone call transaction, the call length value may be more indicative of fraud than a variable associated with the time of day, so the call length variable would have a higher weight, (e.g., 3), than the weight of the time of day variable, (e.g., 2).

Figure 4:
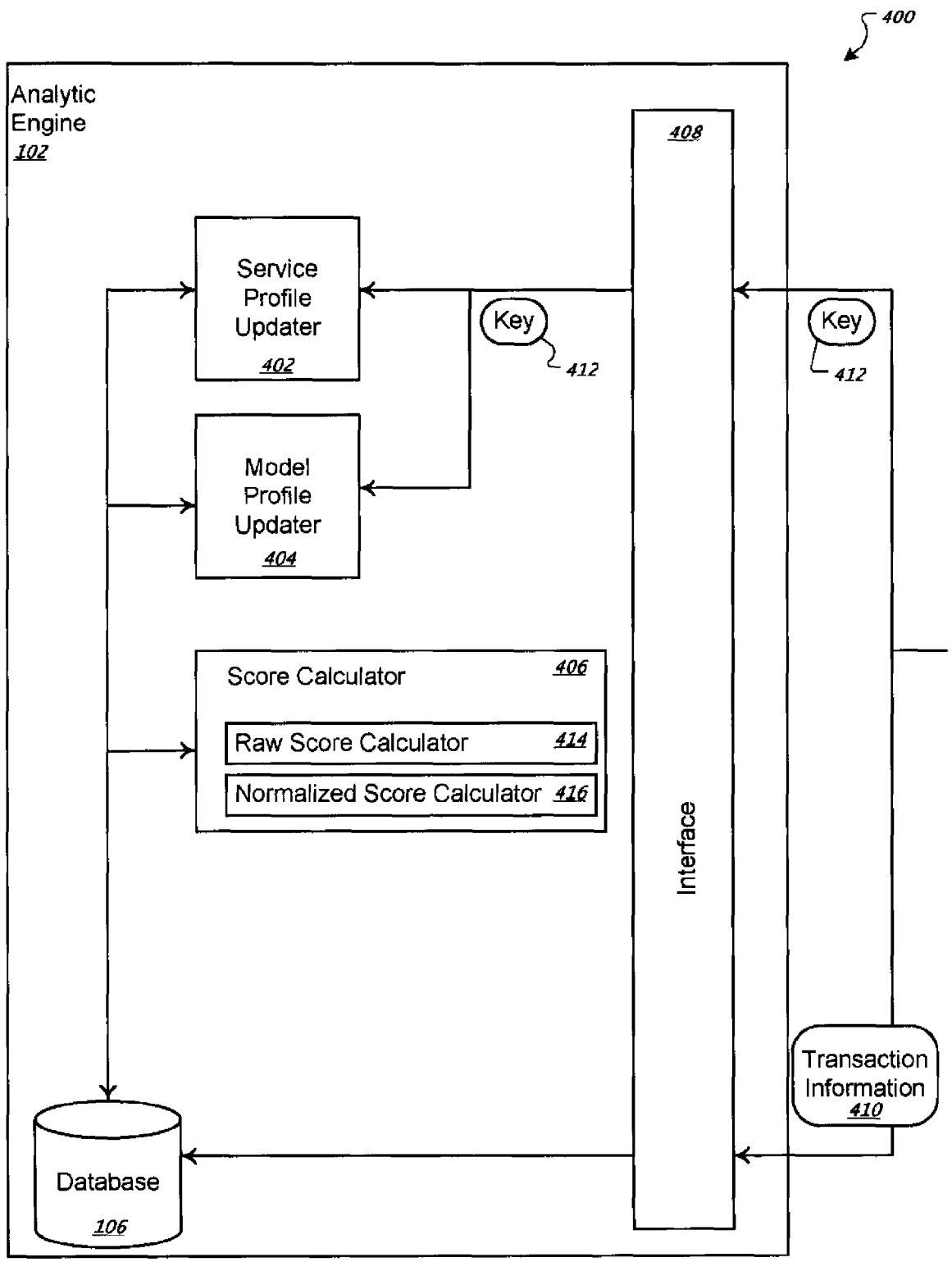
FIG. 4 is a schematic of an example architecture of the analytic engine.

FIG. 4 is a schematic 400 of an example architecture of the analytic engine 102. The analytic engine 102 contains a service profile updater 402, a model profile updater 404, a score calculator 406, a database 106 and an interface 408. The analytic engine 102 receives transaction information 410 through the interface 408. A part of the transaction information 410 can include a key 412 that identifies an entity, such as a person associated with the transaction. For example, in a credit card transaction the credit card number can act as a key that is associated with a credit card holder. In a phone call transaction the customer's phone number can be a key that identifies the phone account holder.

The service profile updater 402 updates a service profile. Service profiles can include typical fraud variables associated with a particular kind of service. For example, when receiving credit card transaction information, the service profile updater 402 can use the credit card number key to look up a service profile associated with the credit card holder.

The service profile updater 402 updates the service profile with the received transaction information. For example, when receiving phone call transaction information the service profile updater 402 can look up a phone call service profile using a telephone number that originated the call. After the correct service profile is identified, variables included in the service profile (e.g., variables related to call length, originating country code, originating phone number, destination country code, destination phone number, call date, and call time) can be updated with information from the phone call transaction information.

The model profile updater 404 updates model profiles. Model profiles can include percentile and parameter values that are part of an analytic model used to predict fraudulent transactions. The model profile can be updated after the service level profile is updated. For example, a service level profile may include a variable associated with the call length of a phone call. After the service level profile is updated with the received call length value, an average call length based on the call lengths received over a predetermine period (e.g., a day) can be calculated and stored in the service profile.

In one implementation, the average call length from the service profile can then be used to update the parameter values associated with call length in the model level profile. For example, the average call length can update (e.g., be included in) a previous distribution of values for call length received from a variety of service profiles.

The analytic engine 102 can then use a percentile threshold of the updated distributions to determine if the value used to update the distribution falls within an outlier range of the distribution, which in turn, may indicated fraudulent activity.

For example, the calculations for determining fraud for phone call length can use the 95th percentile as a threshold above which fraud is probable. The 95th percentile value which is a value that is larger than 95% of all the recent observed values. The distribution of values for the call length variable can be updated after the received call length value is added to the distribution.

The score calculator 406 contains a raw score calculator 414 and a normalized score calculator 416. In some instances, the raw score calculator 414 calculates a raw, linear score for the transaction as described above. The raw score distribution can be affected by a plurality of factors, such as the number of transactions in a particular environment and the fraud rate existing in that environment. For example, raw score distributions for a local phone company may differ from scores in a foreign phone company.

To increase continuity and consistency of score interpretation, the score calculator 406 can use a normalized score calculator 416 to normalize the raw scores on a consistent scale, such as between 1 and 999. In some implementations, the top 1% risky transactions in an environment can be scaled to be above some threshold value less than 999, such as 700. For example, for a local phone company, the top 1% risky transactions may have a normalized score above 700, and likewise for a foreign phone company, the top 1% risky transactions will also have normalized scores above 700, despite the potential differences in distributions of raw scores between the two environments.

In some implementations, a normalized score can be formally expressed as follows:

$$\text{score} = g(\eta, k_1, k_2, \ldots k_I), \tag{4}$$

$$k_1 = g^{-1}(\eta, \text{score}, k_2, \ldots k_I)|_{\eta = \eta_r, \text{score} = s_r, k_2, \ldots k_I}, \tag{5}$$

where η is the raw score, and score is the final score seen by the user. The parameter r is the top percentage of the most risky service IDs, $\eta_r$ is the raw score associated with r, and $s_r$ is the final score to which we would like to map $\eta_r$. Equation (4) describes the map from the raw score η to the final score, where $k_i$, i=1, . . . , I, are the parameters of the mapping function. The mapping function g(·) maps the raw score of any given range to a finite range of final scores. The function g(·) is monotonic in η.

Equation (5) is an inverse function of g(·) describing the map from $\eta_r$ to $k_1$. The parameters $k_i$, i=2, . . . , I can be fixed and $k_1$ computed based on $\eta_r$ such that $\eta_r$ is mapped to score=$s_r$, where $s_r$ is pre-selected. Therefore, upon new observations of $\eta_r$, a new value of $k_1$ is computed according to Equation (5), and this new value is in turn used in Equation (4) to transform the raw score η.

One component in the adaptive score calibration described above is the determination of $s_r$ given r. This is done through the percentile estimation method, outlined previously in Equations (1) and (2). The method is to determine the r-th percentile dynamically as the raw score η is computed for each transaction coming into the system. The percentile estimation method does not need to wait for the raw scores for all the transactions to compute the r-th percentile, which may be different from other methods of obtaining percentiles.

To summarize the implementation described above, after a transaction is scored with a raw score η by the model, the adaptive score calibration of the raw score η includes the following steps: the r-th percentile $η_r$ is updated using η according to Equations (1) and (2); the parameter $k_1$ is computed using Equation (5); and the calibrated score score is computed using Equation (4).

The normalized scaling technique also applies to segments. A segment is a subset of a model which has its own fraud characteristics and therefore its own parameter values. For example, in telecommunications domains, a global model will include all phone calls, whereas a segmented model can include segments such as residential landline, business landline, residential mobile, and business mobile. The fraudulent threshold for phone call length may be 97% (e.g., 2 hours 23 minutes) for residential landline and 96% (e.g., 1 hour 43 minutes) for residential mobile. Segment-specific parameters are stored in segment model profiles. The raw score distributions may vary between segments in a model, for the same reasons that scores in different models may have different distributions. Normalizing raw scores may ensure that normalized scores are on a consistent scale across segments.

FIG. 5A is a flowchart of transaction data processing performed by the analytic engine 102, according to one implementation. In step 510, transaction information is received, which includes a key. For example, in a phone call transaction, the transaction data can be received as a call data record (CDR), which includes a customer phone number as a key and other transaction values pertaining to a phone call. In a credit card transaction, the credit card number can act as a key.

In step 520, service level variables are updated. Service level variables 562 can be stored in a service profile 560. The service profile information is accessed using the key received in step 510. For example, the CDR received in step 510 may contain a phone number which can be used to identify a particular service profile 560 by matching the key from the CDR to a profile key (PK) 564 in the service profile 560. Service profiles can include variables indicative of fraud for a particular kind of service. For example, for credit card transactions, the service profile can contain a set of variables derived from data elements such as purchase amount, transaction date and transaction time.

In step 530, model level parameters are updated. Model level parameters can be stored in a model profile 570. Model profiles can store percentiles 572 and associated values that are related to the fraud variables. For example, a value such as 4 hours for a 95th percentile for call length may be a threshold parameter for detecting fraud for phone call transactions. The model profile may be either a global model profile which contains parameters for all transactions, or it may be a segment profile, which contains parameters specific to certain segments, as previously discussed.

The model profile information is accessed by matching the key received in step 510 to a profile key (PK) 574 in the model profile 570. For example, the CDR received in step 510 may contain a phone number. A determination can be made regarding whether the phone number is in a particular segment, such as residential. The associated model profile can be retrieved and the model profile parameters can be updated.

In step 540, a score is calculated. For example, the score can be calculated using the variable values that have been stored in the service profiles and the parameters that have been stored in the model profile associated with the segment. In step 550, a determination is made to see whether there are any more transactions. If there are no more transactions the method ends. If there are more transactions the method can branch to step 510 to receive the next transaction values.

Figures 6A, 6B:
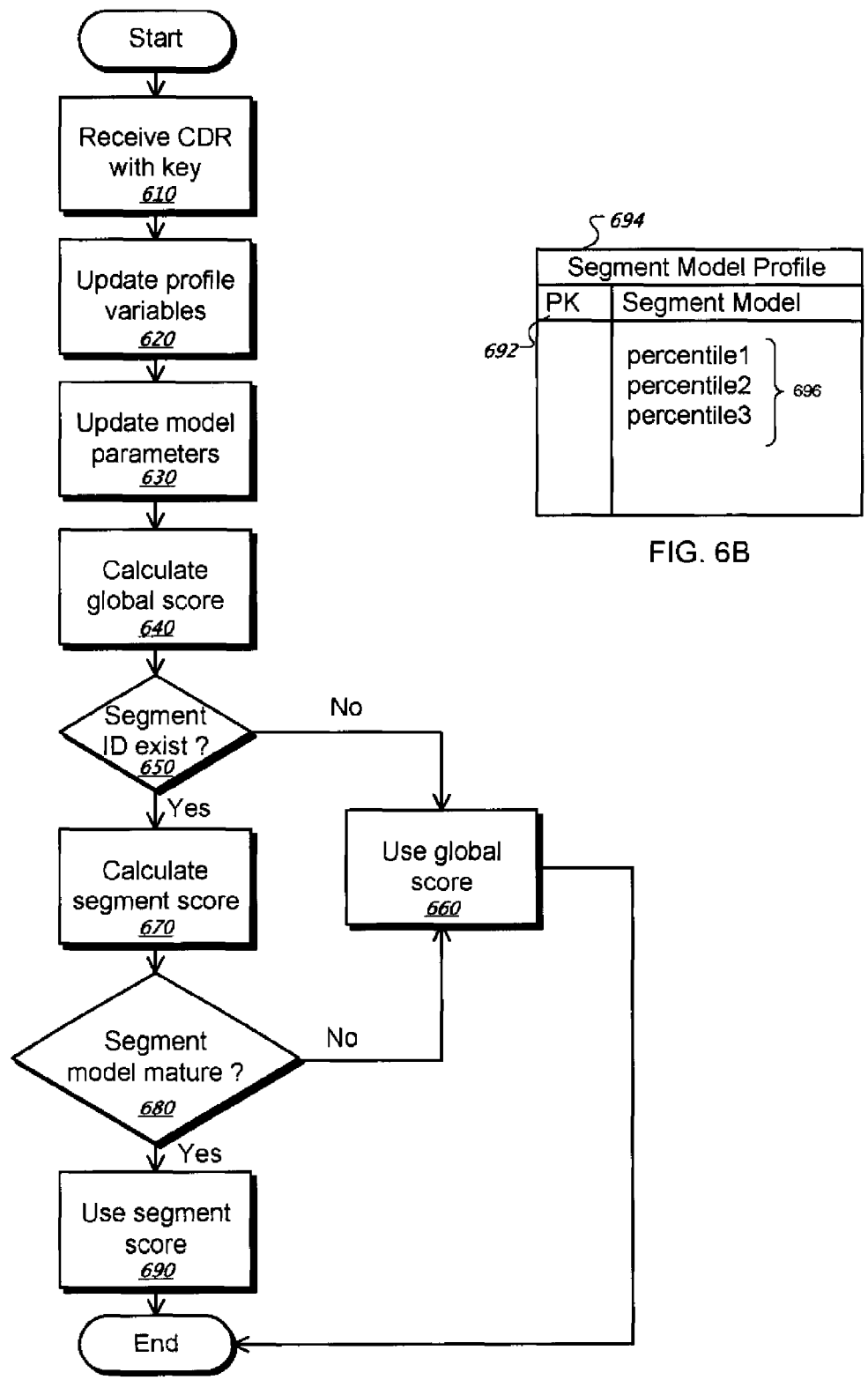
FIG. 6A is a flowchart of transaction data processing according to one implementation.
FIG. 6B is a diagram of a segment profile.

FIG. 6A is a flowchart of transaction data processing according to one implementation. Steps 610, 620 and 630 can be substituted similar to steps 510, 520 and 530 of FIG. 5.

In step 640, a global score is calculated, using the variable values that have been stored in the service profiles and the parameters that have been stored in the model profile. A global score can use the values for substantially all of monitored transactions.

In step 650, a segment identifier in the API is used to retrieve the segment profile key (PK) 692 to access the appropriate segment profile 694 that matches the key received in step 610. An example of a segment profile is shown in FIG. 6B.

If step 650 fails because there is no segment identifier specified in the API, step 660 is performed. In step 660, the global score calculated earlier is the score used to test for probability of fraud for the transaction.

If a matching segment exists, step 670 is performed. In step 670, a segment score is calculated, using a segment-specific distribution and segment-specific percentile values 696 (as shown in FIG. 6B). In step 680, a determination is made to evaluation whether the segment model is mature or not. Segment models may not have enough values in the distribution for the summary statistics to be reliable. If the segment model is not mature (based on a predetermined reliability threshold), step 660 is performed, and the global score is used.

If the segment model is mature, step 690 is performed. In step 690, the segment score is used to determine if the transaction is fraudulent or not.

Figure 7:
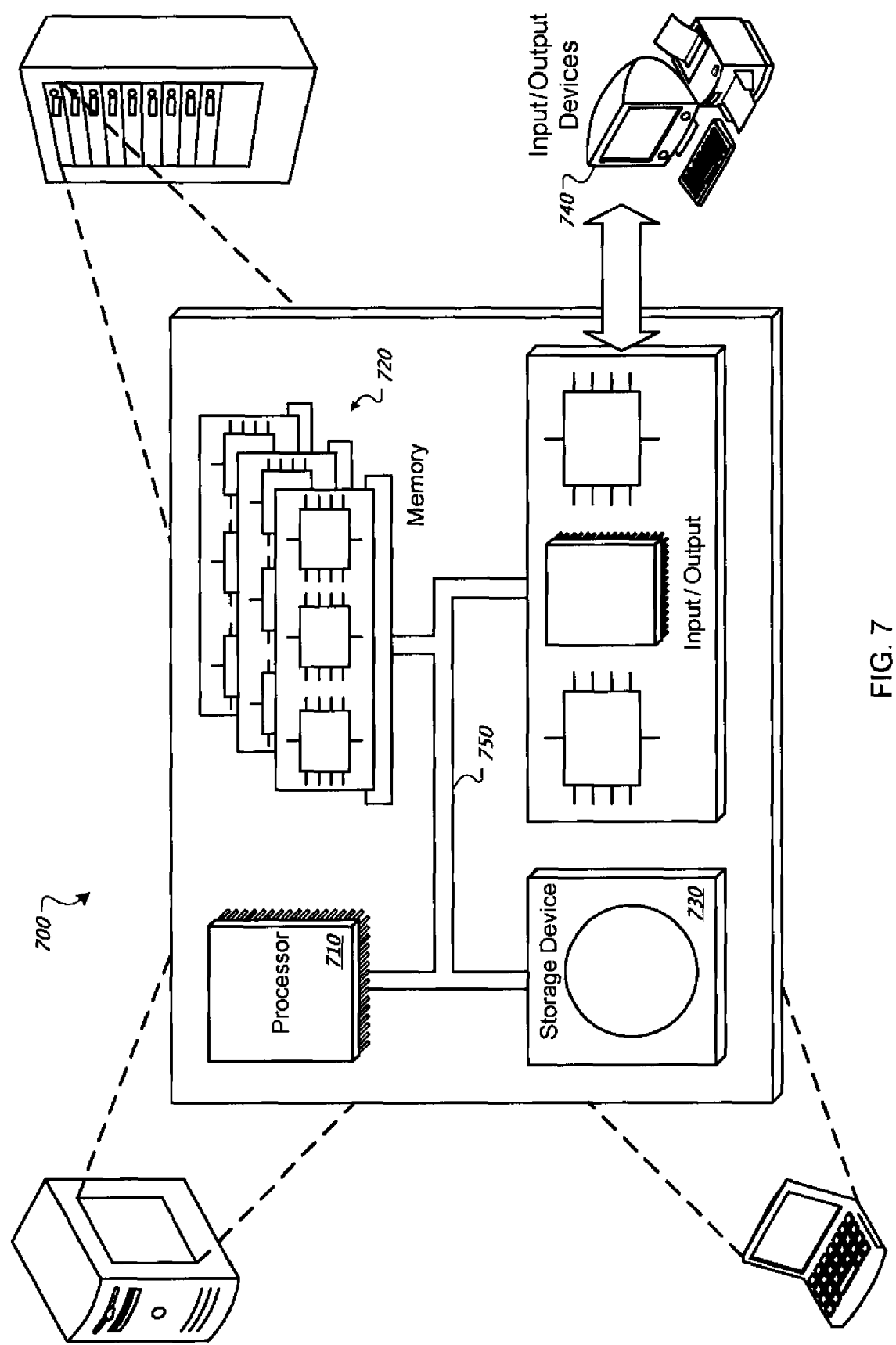
FIG. 7 is a schematic diagram of a computer system.

FIG. 7 is a schematic diagram of a computer system 700. The system 700 can be used for the operations described in association with any of the computer-implement methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, certain variables in the equations, such as $\beta_2$, can be selected from by the user instead of being calculated based upon other variables, such as $\Theta_1$.

In other examples, a generic data model may be introduced into production instead of building a model based on a particular environment that is monitored for fraud. The generic model can then be refined by the self-scaling variables as described above. This may increase the deployment speed of models in new environments.

In some implementations, the generic models may be based on historical data from environments that are similar, but not the same, as the target environment. For example, a model can be developed based on monitored medical billing practices for general physicians. This model may serve as a generic model for monitoring billing practices for other doctors, such as orthopedic surgeons. The generic model can be implemented and dynamically refined as billing transactions associated with orthopedic surgery are received and analyzed.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for dynamically updating a model comprising:
accessing a model that specifies expected characteristics for a transaction, wherein the model comprises variables associated with fraud;
receiving at least one value for each of the variables while monitoring transactions;
updating a distribution of values for each variable based on the received value, wherein the received value is compared with the updated distribution to determine a deviation from a threshold value associated with a percentile of the updated distribution that is indicative of fraud; and
scaling the determined deviation based on a variance range between the threshold value and a maximum expected value of the updated distribution.

2. The method of claim 1, wherein the scaled determined deviation is calculated based on an equation comprising:

$$q(x_i|\theta) \equiv \frac{x_i - \theta_1}{\theta_2} \in [0, C]$$

where q is the scaled determined value, $x_i$ is the received value for a variable, $\Theta_1$ is the threshold value associated with the percentile of the updated distribution that is indicative of fraud, $\Theta_2$ is the variance range, and C is a constant that defines a maximum value to which the scaled determined deviation can be scaled.

3. The method of claim 2, further comprising determining a score indicative of a probability of fraud for the transaction based on the scaled determined deviation.

4. The method of claim 3, wherein the score is calculated based on an equation comprising:

$$\eta = \Sigma q(x_i|\theta)$$

where $\eta$ is the score.

5. The method of claim 4, further comprising weighting each scaled determined deviation with a coefficient correlated to an assigned importance of each variable within the model.

6. The method of claim 4, further comprising applying an adaptive score calibration to the score so that scores between model segments are normalized.

7. The method of claim 1, further comprising scaling the determined deviation based on a variance range assigned or selected by a user.

8. The method of claim 1, further comprising scaling the determined deviation based on a variance range between the percentile of the updated distribution that is indicative for fraud and a percentile of the updated distribution that is indicative of a maximum significant value.

9. The method of claim 1, further comprising generating a preliminary distribution of values for each variable based on an aggregation of historical transactions, wherein generating the distribution of values occurs before updating the distribution of values.

10. The method of claim 1, wherein the model includes a global model that specifies expected characteristics for the transaction based on substantially all of the monitored transactions.

11. The method of claim 1, wherein the model comprises segments.

12. The method of claim 11, wherein at least one of the segments is generated based on user input.

13. The method of claim 11, wherein the at least one segment's expected characteristics for the transaction differ from expected characteristics of other segments of the global model.

14. The method of claim 13, further comprising identifying the received value as associated with the at least one segment and exclusively updating, relative to the other segments, the distribution of values for each variable of the at least one segment based on the received value.

15. The method of claim 14, further comprising updating the distribution of values for each variable of the global model based on the received value.

16. The method of claim 14, further comprising determining a score indicative of a probability of fraud for the transaction based on the updated at least one segment.

17. The method of claim 15, further comprising determining a score indicative of a probability of fraud for the transaction based on the updated global model if substantially insufficient statistics have been gathered for the at least one segment.

18. The method of claim 1, further comprising determining a score indicative of a probability of fraud for the transaction based on the deviation of the received value from the threshold.

19. The method of claim 1, wherein the percentile of the updated distribution that is indicative of fraud is different from percentiles of the updated distribution for other variables in the model.

20. The method of claim 1, wherein the variables are included in a service profile of the model, the service profile being associated with a party related to the transaction.

21. The method of claim 20, further comprising extracting a profile identifier from the transaction and identifying the service profile based on the profile identifier.

22. The method of claim 1, wherein the distribution of values for each variable are included in a model profile of the model, the model profile specifying the expected characteristics for the transaction.

23. A method for processing a transaction comprising:
receiving, at a second computing device and from a first computing device that initiates an electronic transaction, a value for a variable associated with the transaction, wherein the variable is indicative of fraud;
updating, by the second computing device, a distribution of values for the variable based on the received value, wherein the updated distribution of values is used to determine a deviation of the received value from a selected value in the updated distribution;
scaling the determined deviation based on a variance range between the selected value and a maximum expected value of the updated distribution; and
determining a score indicative of a probability of fraud for the transaction, wherein the score is based on the deviation of the received value from the selected value and is proportionate to an existence of fraud in the electronic transaction.

24. The method of claim 23, wherein the selected value is based on a fixed percentage of the distribution values, and wherein the fixed percentage defines a threshold above which values are determined to be substantially atypical for the variable.

25. A system for determining fraud comprising:
an interface to receive values associated with a transaction, each value corresponding to a property correlated to fraudulent transactions;
a profile updater to modify a distribution of values for each property based on the corresponding received value; and
a score calculator to generate a fraud score for the transaction, wherein generating the fraud score comprises:
comparing the received value with the modified distribution of values to determine a deviation of the received value from a threshold value of the modified distribution of values, wherein the threshold value corresponds to a threshold percentile of the modified distribution of values at which received values begin to be identified as indicative of fraud, and
scaling the determined deviation to the difference between the threshold value and a maximum expected value for the modified distribution of values.

26. A method for generating a fraud indicator comprising:
generating a score indicative of a probability of fraud for a transaction, the generating comprising aggregating self-scaling variables, wherein the self-scaling variables are determined by:
receiving for each self-scaling variable a received value;
updating a distribution of values for each self-scaling variable with the value received for the self-scaling variable;
determining for each self-scaling variable an updated threshold value that is based on the updated distribution of values, wherein the updated threshold value indicates a beginning of a range of values that are unusual relative to the updated distribution, wherein the updated threshold value replaces a previous threshold value that was for the self-scaling variable before the value for the self-scaling variable was received; and
scaling the received value based on the updated threshold value.

27. The method of claim 26, further comprising receiving values for the self-scaling variables associated with transactions during a monitoring of the transactions, wherein each self-scaling variable is an indicator of a probability of fraud.

28. The method of claim 26, further comprising weighting each of the self-scaling variables to indicate a contribution of the variable in the aggregation.

29. A computer program product tangibly embodied in a machine-readable storage device, the computer program product including instructions that, when executed by a processor, perform operations for determining a fraud indicator, the operations comprising:
accessing a model that specifies expected characteristics for an electronic transaction initiating from a computerized device, wherein the model comprises variables that are associated with fraud, each variable has a distribution of values, and each variable has a parameter value that corresponds to a threshold percentile at which received values are associated with fraud;

receiving from the transaction a value for each of the variables;

updating the distribution of values for each variable by adding the received value for the variable to the distribution of values;

updating the parameter value that corresponds to the threshold percentile at which received values are associated with fraud based on the distribution of values being updated;

generating a scaled value by scaling the received value between the updated parameter value and a maximum expected value for the distribution of values; and generating, based on the scaled value, a fraud score that is proportionate to an existence of fraud.

30. A computer program product tangibly embodied in a machine-readable storage device, the computer program product including instructions that, when executed by a processor, perform operations for determining a fraud indicator, the operations comprising:

accessing a model that specifies expected characteristics for a transaction, wherein the model comprises variables associated with fraud;

receiving at least one value for each of the variables while monitoring transactions;

updating a distribution of values for each variable based on the received value, wherein the received value is compared with the updated distribution to determine a deviation from a threshold value associated with a percentile of the updated distribution that is indicative of fraud; and scaling the determined deviation based on a variance range between the threshold value and a maximum expected value of the updated distribution.

* * * * *

UNITED STATES PATENT AND TRADEMARK OFFICE
CERTIFICATE OF CORRECTION

PATENT NO. : 8,027,439 B2  
APPLICATION NO. : 11/532859  
DATED : September 27, 2011  
INVENTOR(S) : Scott M. Zoldi et al.

Page 1 of 1

It is certified that error appears in the above-identified patent and that said Letters Patent is hereby corrected as shown below:

In the Claims:

Column 12, line 48, in Claim 2, delete "x," and insert -- $x_i$ --, therefor.

Signed and Sealed this  
Twenty-second Day of November, 2011

David J. Kappos  
*Director of the United States Patent and Trademark Office*